United States Patent
Sanders et al.

(10) Patent No.: US 10,791,091 B1
(45) Date of Patent: Sep. 29, 2020

(54) HIGH ASSURANCE UNIFIED NETWORK SWITCH

(71) Applicant: Architecture Technology Corporation, Eden Prairie, MN (US)

(72) Inventors: Clint Sanders, Eden Prairie, MN (US); Ranga S. Ramanujan, Eden Prairie, MN (US); Timothy Hartley, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 312 days.

(21) Appl. No.: 15/895,897

(22) Filed: Feb. 13, 2018

(51) Int. Cl.
*H04L 29/06* (2006.01)
*H04L 12/18* (2006.01)
*H04L 12/761* (2013.01)

(52) U.S. Cl.
CPC .......... *H04L 63/0218* (2013.01); *H04L 12/18* (2013.01); *H04L 29/06* (2013.01); *H04L 45/16* (2013.01); *H04L 63/0485* (2013.01); *H04L 63/0853* (2013.01); *H04L 63/162* (2013.01)

(58) Field of Classification Search
CPC ..... H04L 63/0218; H04L 12/18; H04L 29/06; H04L 45/16; H04L 63/0485; H04L 63/0853; H04L 63/162
USPC .......................................................... 726/2
See application file for complete search history.

(56) References Cited

U.S. PATENT DOCUMENTS

| | | | | |
|---|---|---|---|---|
| 2004/0103205 A1* | 5/2004 | Larson | ............... | H04L 61/2092 709/229 |
| 2005/0047411 A1* | 3/2005 | Kadambi | ............... | H04L 12/46 370/389 |
| 2005/0122966 A1* | 6/2005 | Bowes | ............... | H04L 12/5601 370/360 |
| 2005/0141501 A1* | 6/2005 | Kadambi | ............... | H04L 12/46 370/389 |
| 2006/0136570 A1* | 6/2006 | Pandya | ............... | H04L 63/20 709/217 |
| 2007/0280258 A1* | 12/2007 | Rajagopalan | ......... | H04L 45/245 370/395.3 |

(Continued)

OTHER PUBLICATIONS

A near optimal scheduler for switch-memory-switch router Adnan Aziz, Amit Prakash, Vijaya Ramachandran SPAA '03: Proceedings of the Fifteen Annual ACM Symposium on Parallel Algorithms and Architectures. Jun. 2003, pp. 343-352 (Year: 2003).*

(Continued)

*Primary Examiner* — Kambiz Zand
*Assistant Examiner* — Mohammad S Shams
(74) *Attorney, Agent, or Firm* — Foley & Lardner LLP

(57) ABSTRACT

Disclosed is a high assurance unified switching device corresponding to a modular, standards-compliant extensible network switch supporting multiple security domains with data isolation of multiple data packets obtained from the multiple security domains. The device may comprise an inner layer router and an outer layer security wrapper (outer layer router). The ports on the outer layer router are configured for different security domains and assigned corresponding key pairs. The ports use the assigned key pairs for encrypting data packets prior to routing and decrypt the data after routing such that there is an isolation of data packets of different security domains. A routed packet arriving at the wrong port cannot be decrypted and therefore is dropped.

20 Claims, 4 Drawing Sheets

(56) References Cited

U.S. PATENT DOCUMENTS

| | | | |
|---|---|---|---|
| 2008/0141023 A1* | 6/2008 | Qi | H04L 63/0428 |
| | | | 713/155 |
| 2011/0317700 A1* | 12/2011 | Assarpour | H04L 45/54 |
| | | | 370/392 |
| 2014/0169173 A1* | 6/2014 | Naouri | H04L 47/10 |
| | | | 370/237 |
| 2016/0014098 A1* | 1/2016 | Wakumoto | H04L 63/0485 |
| | | | 713/153 |
| 2017/0118180 A1* | 4/2017 | Takahashi | H04L 63/0227 |
| 2018/0068032 A1* | 3/2018 | Levy | H04L 45/7453 |
| 2019/0109820 A1* | 4/2019 | Clark | H04L 47/19 |

OTHER PUBLICATIONS

Ns-3-click: Click modular router integration for ns-3 P. Lalith Suresh, Ruben Merz Proceedings of the 4th International ICST Conference on Simulation Tools and Techniques. Mar. 2011, pp. 423-430 (Year: 2011).*
SeL4 Docs, https://docs.sel4.systems/#What_is_formal_verification. 3F, retrieved from the web on May 9, 2018, 3 pages.

* cited by examiner

HIGH ASSURANCE UNIFIED NETWORK SWITCH

TECHNICAL FIELD

This application relates generally to field of network switches, and more specifically to the network switches that provide data isolation of different types of data packets originating from multiple data sources.

BACKGROUND

Conventional network switches are inadequate to support enterprise security system applications that are seeking to migrate from independent, stove-piped sensors and the corresponding analysis systems to a network-centric approach. The network-centric approach allows devices of different security domains to communicate with each other, thereby reducing quantity of the redundant equipment and enhancing data sharing. However, conventional network switches operate at a single security domain and do not provide data isolation between multiple security domains, so multiple network switches have to be used for a network having multiple security domains. Furthermore, it is cumbersome to move network resources between different security domains in a network formed by conventional network switches. Reconfiguring the network from a first security domain to a second security domain would require unplugging network cables from a first switch associated with the first security domain and plugging the network cables to a second switch associated with the second security domain.

SUMMARY

What is therefore desired are systems and methods that provide effective data isolation in a network switch between data packets generated by multiple data sources and obtained from multiple co-located networks assigned to different security domains.

Embodiments disclosed herein may solve the aforementioned technical problem and solve other technical problems as well. Embodiments disclosed herein describe a high assurance unified switching device corresponding to a modular, standards-compliant extensible network switch supporting multiple security domains with data isolation of multiple data packets obtained from the multiple security domains. The device may comprise an inner layer router and an outer layer security wrapper (outer layer router). The ports on the outer layer router are configured for different security domains and assigned corresponding key pairs. The ports use the assigned key pairs for encrypting data packets prior to routing and decrypt the data after routing such that there is an isolation of data packets of different security domains. A routed packet arriving at the wrong port cannot be decrypted and therefore is dropped.

In an embodiment, computer-implemented method comprises receiving, by a first input port of an outer layer router in a switching computer, a first data packet from a first source device, wherein the first input port is associated with a first data security attribute, and wherein the first data security attribute is associated with a first cryptographic key pair; receiving, by a second input port of the outer layer router, a second data packet from a second source device, wherein the second input port is associated with a second data security attribute, and wherein the second data security attribute is associated with a second cryptographic key pair; encrypting, by a processor of the switching computer, a payload of the first data packet using a first key in the first cryptographic key pair to generate a first encrypted data packet; encrypting, by the processor, a payload of the second data packet using a first key in the second cryptographic key pair to generate a second encrypted data packet; routing, by an inner layer router of the switching computer, the first encrypted data packet and the second encrypted data packet to generate a first encrypted routed data packet and a second encrypted routed data packet; receiving, by a first output port of the outer layer router, the first encrypted routed data packet, wherein the first output port is associated with the first data security attribute; decrypting, by the processor, the first encrypted routed data packet using a second key of the first cryptographic key pair to generate a first routed data packet; transmitting, by the first output port, the first routed data packet to a first destination device; receiving, by a second output port of the outer layer router, the second encrypted routed data packet, wherein the second output port is associated with the second data security attribute; decrypting, by the processor, the second encrypted routed data packet using a second key of the second cryptographic key pair to generate a second routed data packet; and transmitting, by the second output port, the second routed data packet to a second destination device.

In another embodiment, a system comprises a first source device configured to generate a first data packet; a second source device configured to generate a second data packet; and a switching computer comprising: an outer layer router comprising a first input port and a second input port, wherein the first input port receives a first data packet from the first source device and wherein the first input port is associated with a first data security attribute, and wherein the first data security attribute is associated with a first cryptographic key pair, and wherein the second input port receives a second data packet from the second source device and wherein the second input port is associated with a second data security attribute, and wherein the second data security attribute is associated with a second cryptographic key pair; and a processor configured to: encrypt a payload of the first data packet using a first key in the first cryptographic key pair to generate a first encrypted data packet; and encrypt a payload of the second data packet using a first key in the second cryptographic key pair to generate a second encrypted data packet; and an inner layer router configured to: route the first encrypted data packet and the second encrypted data packet to generate a first encrypted routed data packet and a second encrypted routed data packet; the outer layer router further comprising a first output port and a second output port, wherein the first out port receives the first encrypted routed data packet, wherein the first output port is associated with the first data security attribute, and wherein the second out port receives the second encrypted routed data packet, wherein the second output port is associated with the second data security attribute; the processor is further configured to: decrypt the first encrypted routed data packet using a second key of the first cryptographic key pair to generate a first routed data packet, wherein the first out port transmits the first routed data packet to a first destination device; and decrypt the second encrypted routed data packet using a second key of the second cryptographic key pair to generate a second routed data packet, wherein the second out port transmits the second routed data packet to a second destination device.

BRIEF DESCRIPTION OF THE DRAWINGS

The accompanying drawings constitute a part of this specification and illustrate embodiments of the subject matter disclosed herein.

DETAILED DESCRIPTION

Figure 1A:
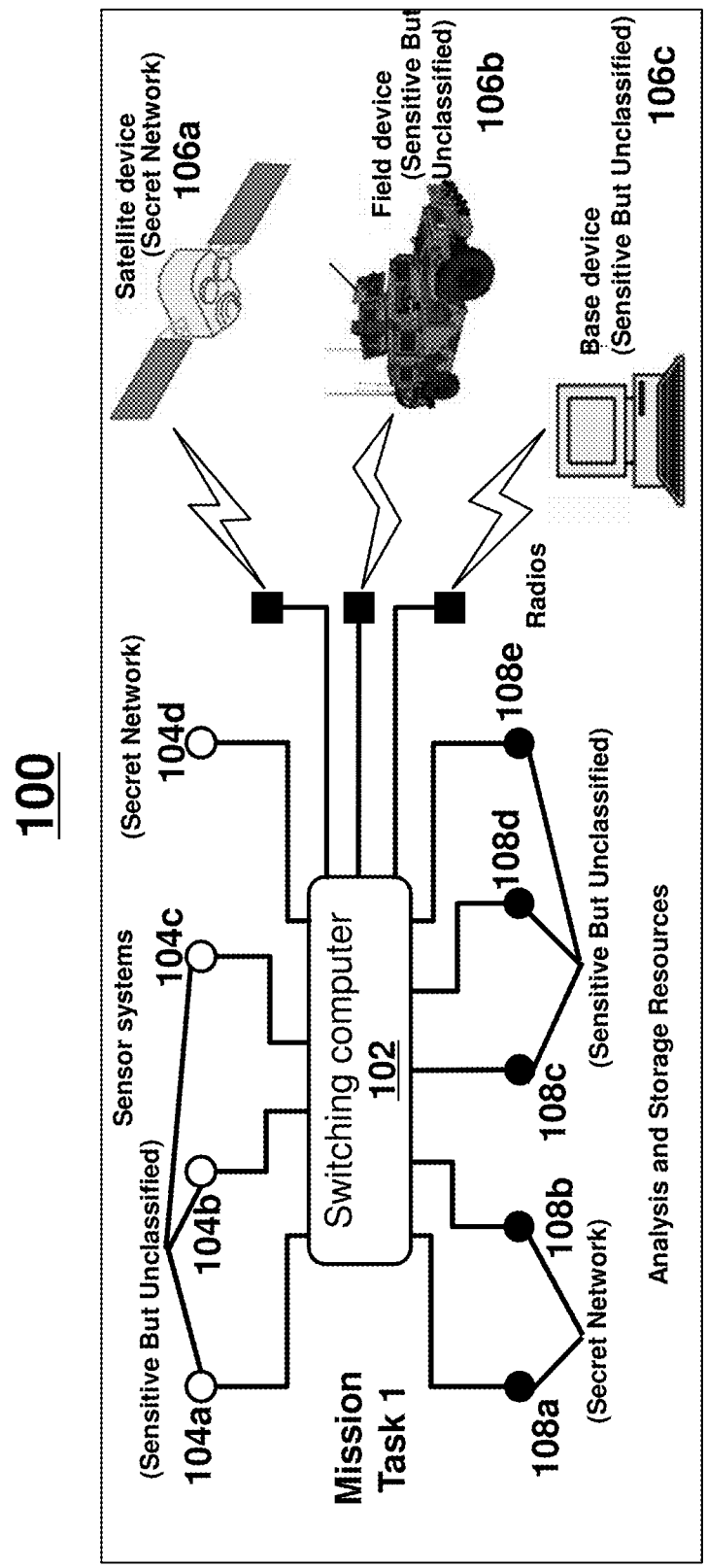
FIG. 1A illustrates an exemplary system employing a network switching computer for isolation of intersystem data communication, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The present disclosure discloses a high assurance unified switch (HAUS) device that provides a product solution to deliver a modular, standards-compliant extensible network supporting multiple security domains with definite data isolation of multiple data packets obtained from multiple networks with different security domains. The HAUS device may be deployed on multiple commercially off-the-shelf (COTS) hardware platforms to create high-assurance open flow-based software defined networking (SDN) switch products customized to meet differing commercial requirements for size, weight, power, speed, standards, and a number of ports. The HAUS-based switch products may be used by security service users such as military users requiring a reconfigurable, high-assurance network switch device to manage data packets from multiple co-located networks assigned to different security domains, for example manned and unmanned military vehicle environments.

The security-oriented network switch device described herein may be a layer-2 network product for a virtual local area network (VLAN) and software-defined networking (SDN). The network switch device may combine an open flow based control plane with a custom data plane design to address VLAN and SDN switch security problems that prevent commercial switches from being used in environments like manned and unmanned military vehicles. The network switch device may independently service multiple network segments to provide isolated data paths limited to equipment in a same security domain, reducing or eliminating the security requirements placed on data generation and analysis devices such as a sensor device, a communication device, and analysis systems, and thereby allowing a wider choice of security systems for usage.

Figure 1B:
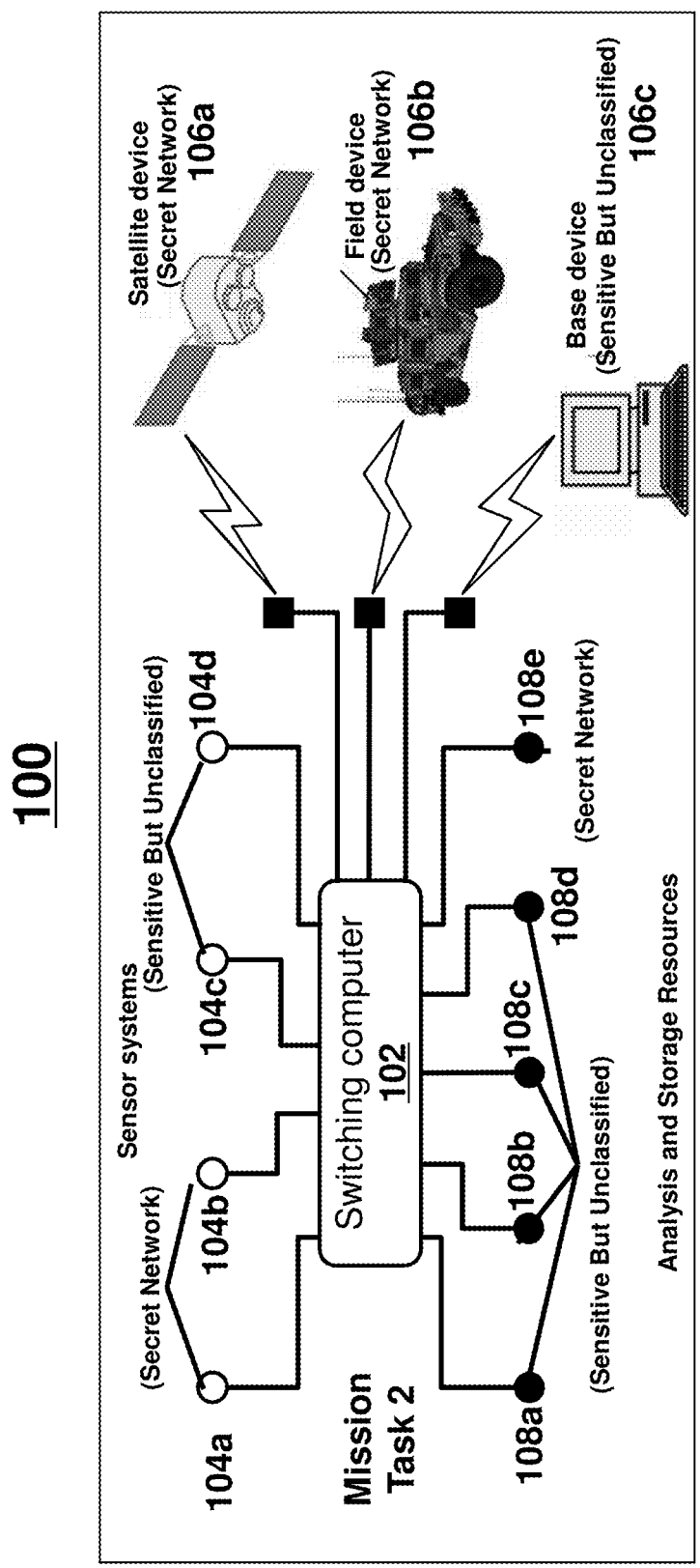
FIG. 1B illustrates an exemplary system employing a network switching computer for isolation of intersystem data communication, according to an exemplary embodiment.

FIGS. 1A and 1B illustrate an exemplary system 100 (such as vehicle system) employing a network switching computer 102 for isolation of intersystem data communication. The system 100 described herein has two security domains, namely, a secret domain and a sensitive but unclassified domain. It is to be noted that the system 100 employing the network switching computer 102 for isolation of intersystem data communication may have more than two security domains in other embodiments of the present disclosure without limiting the scope of the disclosed embodiments. The system 100 described in the FIGS. 1A and 1B may further include four sensor systems (104a, 104b, 104c, and 104d), three radio devices (106a, 106b, and 106d), and five computer nodes (108a, 108b, 108c, 108d, and 108e) for data packet generation, analysis, and storage.

The sensor systems 104, the radio devices 106, and the computer nodes 108 may be configured to be connected to each other to transmit and receive data packets through one or more communication network platforms. The examples of the communication network platform may include, but are not limited to, private or public LAN, WLAN, MAN, WAN, and the Internet. The communication network platform may include both wired and wireless communications according to one or more standards and/or via one or more transport mediums. The communication over the communication network platform may be performed in accordance with various communication protocols such as Transmission Control Protocol and Internet Protocol (TCP/IP), User Datagram Protocol (UDP), and IEEE communication protocols. In one example, the communication network platform may include wireless communications according to Bluetooth specification sets, or another standard or proprietary wireless communication protocol. In another example, the communication network platform may also include communications over a cellular network, including, e.g. a GSM (Global System for Mobile Communications), CDMA (Code Division Multiple Access), EDGE (Enhanced Data for Global Evolution) network.

The system 100 described herein may operate in a cloud-computing environment where the sensor systems 104, the radio devices 106, and the computer nodes 108 are cloud-optimized and transmit a request for transmitting and receiving data packets associated with one or more mission tasks to the network switching computer 102. The sensor systems 104, the radio devices 106, and the computer nodes 108 data and application programs may be stored and executed on cloud-based server systems accessed over a network cloud. In the cloud computing environment, a web browser on client computing devices of the system 100 may interface with an application program that is executed on the cloud-based server systems. Through the browser on the client computing devices, a user may generate a request for transmitting and receiving mission task data associated with the one or more mission tasks, and transmit the request to the cloud-based server systems via the application program. In some embodiments, the system 100 described herein operate in a cloud computing environment where the client computing devices may transmit to the cloud-based server systems a request for transmitting and receiving the mission task data associated with the one or more mission tasks. The data and application programs received from the cloud-based server systems to the client computing devices may be stored locally in the client computing devices and executed on local computing resources of the client computing devices.

Sensor systems 104 may include a sensor device and a user interface. The sensor system 104 may also include an auxiliary device. The user interface may be a handheld device, such as a handheld computer, personal data assistant (PDA), telephone, remote control, and the like. The sensor system 104 may include a connector for connecting to sensor electronics. The sensor electronics power supply may be activated when the sensor device is connected. The sensor electronics may include one or more of a sensor power supply, a regulator, a signal processor, a measurement processor, a measurement memory and a reference memory. The user interface may include one or more of a user interface power supply, a user interface processor, a reference memory, a measurement processor, a measurement memory, a signal processor, a regulator, and a mechanism for receiving data from an input device and/or sending data to an output device. The user interface and the sensor electronics may either or both include a wireless communication mechanism.

The sensor device of the sensor system 104 may preferably be a real-time sensor that senses data values substantially continuously over an extended period of time and makes the data values available for use as the data values are being sensed and collected rather than having to download substantially all the collected data values at a later time for use. The user interface allows to interact with the sensor device. The user interface may include one or more of an output device such as a liquid crystal display (LCD), a light emitting diode (LED), a touch screen, a dot matrix display, plasma display, voice synthesizer, and the like; an input device such as a keypad, one or more buttons, a keyboard, a mouse, a joystick, a radio frequency (RF) receiver, an infrared (IR) receiver, an optical receiver, a microphone, and the like. The user interface may be a handheld device such as a handheld computer, a personal digital assistant (PDA), a cell phone or other wireless phone, a remote control, and the like. Alternatively, the user interface may be a personal computer (PC), a desk top computer, a lap top computer, and the like, Radio devices 106 may be electronic devices that receives radio data waves and converts the information carried by the radio data waves to a usable data packet form. Radio devices 106 may be used with an antenna. The antenna intercepts radio data waves (electromagnetic waves) and converts them to tiny alternating currents which are applied to the receiver of the radio devices 106, and the receiver extracts the desired information from the radio data waves. The receiver of the radio devices 106 may use electronic filters to separate the desired radio frequency signal from all the other signals picked up by the antenna, an electronic amplifier to increase the power of the signal for further processing, and finally recovers the desired information through demodulation from the radio data waves. The information produced by the receiver of the radio devices 106 may be in the form of sound, images, or data packets.

The radio devices 106 may be a separate piece of electronic equipment, or an electronic circuit within another device. The radio devices 106 may be used in technology, as components of communications, broadcasting, remote control, and wireless networking systems. Non-limiting examples of the radio devices 106 may include but not limited to a satellite communication device 106*a*, a field communication device 106*b*, and a base communication device 106*c*.

Computer nodes 108 may be any computing and/or telecommunications devices being operated by one or more users. The computer nodes 108 may include a processor and are capable of performing various mission tasks and processes described herein, such as accessing external webservers and/or cloud-based server systems. The computer nodes 108 may provide a GUI interface to a user to interact with a customer-centric website hosted on the external webservers and/or the cloud-based server systems. Non-limiting examples of the computer nodes 108 may include a telephone (e.g., POTS landline telephone, cellular telephone, smartphone), a client computer (e.g., desktop, laptop, server, tablet), or any other telecommunications or computing device used to communicate with the system 100 services. The computer nodes 108 may be associated with a database. In some embodiments, the database may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions. Non-limiting examples of the databases may include a file sharing database, a orient database, and a MySQL database that may store a copy of data records and/or applications/software codes contained within the cloud-based server systems 100.

In operation, a system 100 (such as a vehicle based communication system) is configured to perform a first mission task (as depicted in the FIG. 1A) and a second mission task (as depicted in the FIG. 1B). Conventionally, in order to use such vehicle based communication system 100 for more than one mission task, various electronic and other components of the system 100 are initially arranged and configured to perform the first mission task, and then the electronic and other components of the system 100 are rapidly reconfigured, in a task field or after returning to a base location, for executing the second mission task. The electronic and other components of the system 100 may be rapidly reconfigured by, for instance, identifying hardware device resources as necessary by the second mission task and then allocating the identified hardware device resources to a security domain (such as a secret security domain) as necessary by the second mission task. In order to avoid the difficulty and time consumption for reconfiguring of the hardware components of the system 100 each time the system 100 has to execute a new mission task, the present disclosure illustrates use of a network switching computer 102 in the system 100 for intersystem data communication isolation of various data packet types produced by various electronic components of the system 100 such as the sensor systems 104, the radio devices 106, and the computer nodes 108. The sensor systems 104, the radio devices 106, and the computer nodes 108 may include multiple devices where each device may be configured to generate data corresponding to a specific security domain such as a secret domain, a sensitive domain, a classified domain, and a sensitive but unclassified domain. In some embodiments, the sensor systems 104, the radio devices 106, and the computer nodes 108 may include multiple devices where each device may be configured to generate data corresponding to a plurality of specific security domains such as a secret domain, a sensitive domain, a classified domain, and a sensitive but unclassified domain.

The network switching computer 102 for intersystem data communication isolation of various data packet types produced by various electronic components of the system 100 such as the sensor systems 104, the radio devices 106, and the computer nodes 108 is an open flow compliant software-reconfigurable network switch that facilitates rapid reconfiguration of the various electronic components and the sub-networks of the system 100 each time the system 100 is in the field for a new mission task without requiring any modification to hardware components of the system 100 as required in the conventional techniques.

In some embodiments, the network switching computer 102 may generate one or more instructions to provide high-assurance data isolation between various types of data packets produced by various electronic components of the system 100 such as the sensor systems 104, the radio devices 106, and the computer nodes 108 during multiple mission tasks, and thereby solves the problems associated with conventional techniques used for the system 100 working on the multiple security domains that requires multiple separate switches. For instance, according to conventional techniques, for the system 100 working on the multiple security domains, a first switch may be assigned to a first security domain and a second switch may be assigned to a second security domain. Since the resources of the system 100 cannot be easily moved between these two security domains, therefore between the first mission task and the second mission task, reconfiguring the security domain would require unplugging network cables from the first switch and then plugging the network cables into the second switch. In order to overcome these reconfiguration and unplugging problems associated with conventional techniques, the network switching computer 102 corresponding to a network switch creates separate network segments in the system 100 configured to perform more than one mission task to securely provide isolated data paths connecting various components of the system 100 in a same network security domain, and thereby simplifying the security network requirements of the sensor systems 104, the radio devices 106, the computer nodes 108, and other communication and analysis devices of the system 100 by generating multiple separate security domains in a single network of the system 100. One example implementation of the network switching computer 102 may be a high-speed Ethernet network switch device, which may be used in security service vehicle systems, in secure networks at ground control stations and forward bases of security service personnel, at Global Information Grid (GIG), and by Internet service providers such as cloud service providers employing Software Defined Networks (SDN).

Figure 2:
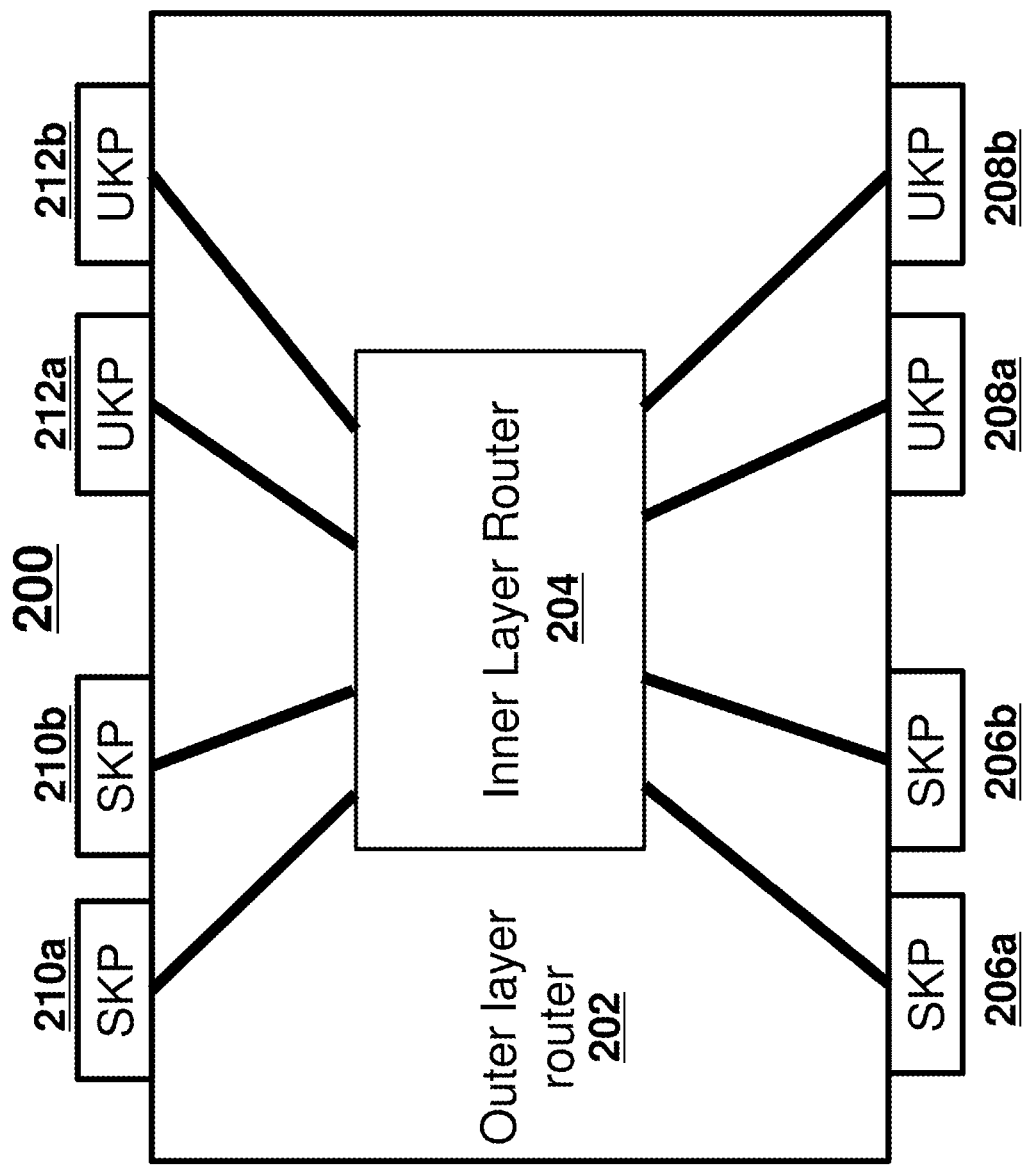
FIG. 2 illustrates an architecture of a network switch device for isolation of intersystem data communication of an enterprise system, according to an exemplary embodiment.

FIG. 2 illustrates an architecture of a network switch device 200 for isolation of intersystem data communication within an enterprise system. The network switch device 200 may include one or more electronic and other components (such as a network switching computer) that is configured to allocate hardware network interfaces among multiple independent internal sub-networks of the enterprise system under control of external network management computing tools. In some embodiments, the external network management computing tools may leverage standards-compliant virtual local area network (VLAN) or software defined networks (SDN) protocols.

The network switch device 200 architecture may include multiple switch devices that channels incoming data packets from any number of multiple input ports (such as 206a, 206b, 208a, and 208b) to a specific output port (such as 210a, 210b, 212a, and 212b) that will take the data packets toward its intended destination device. On an Ethernet local area network (LAN), a switch device may determine from a physical device address in each incoming data packet frame which output port (such as 210a, 210b, 212a, and 212b) to forward the incoming data packet to and out of. In a wide area packet-switched network such as the Internet, a switch device may determine from the IP address in each data packet which output port (such as 210a, 210b, 212a, and 212b) to use for the next part of its trip to the intended destination device. In some embodiments, such as the Open Systems Interconnection (OSI) communications model, a switch device may perform a Layer 2 or data-link layer function. That is, the switch device may analyze each data packet and determines from a physical address which destination device a data packet is intended for and switches the data packet out toward that destination device. However, in wide area networks such as the Internet, the destination address may require a look-up in a routing table by a device known as a router. In some embodiments, the network switch device 200 may also perform routing functions.

In some embodiments, a network switch device 200 may be an Open Flow switch device, which may be a software program or a hardware device that forwards data packets in a software-defined networking (SDN) environment. The Open Flow network switch device 200 may either be based on an Open Flow protocol or compatible with the Open Flow protocol. In some embodiments, a network switch device 200 may be a SDN capable switch device utilizing an Open Flow protocol, which is a standard for enterprise-level organization and management of a layer-2 network equipment. The Open Flow configuration of the network switch device 200 may remove a control plane from the network switch device 200 that directs data packets switching decisions from the network switch device 200 and instead locates the control plane in an Open Flow controller device that has an enterprise-wide view of a network of the enterprise system. The Open Flow protocol may then communicate switching table information to the Open Flow enabled network switch device 200, so that a network map is arrived at the network switch device 200 via a centralized processor, and resulting control tables received at the network switch device 200 are then deployed in a coordinated fashion to all affected devices of the enterprise system. A control table may be placed at each network switch device 200 of the enterprise system, and is then used by a data plane of the network switch device 200 to encrypt a payload of each data packet received on an input port (such as 206a, 206b, 208a, and 208b) of an outer layer router 202 of the network switch device 200 with a public/private key associated with the input port (such as 206a, 206b, 208a, and 208b) of the outer layer router 202 of the network switch device 200. Once the payload of the data packet is encrypted, the encrypted data packet is then routed by an inner layer router 204 (for example, a high performance router device 204) of the network switch device 200 to an output port (such as 210a, 210b, 212a, and 212b) of the outer layer router 202 of the network switch device 200 where the payload of each encrypted data packet is then decrypted at the corresponding output port (such as 210a, 210b, 212a, and 212b) with a same public/private key. In other words, the network switching computer 200 is configured to isolate different data types obtained from different security domains through use of public/private key pairs corresponding to each security domain. As new data packets are received by the network switch device 200, the data packets are then parsed to identify data security attributes contained within the data packets, and then the data packets are encrypted for a corresponding security domain associated with the identified security domain at the input ports (such as 206a, 206b, 208a, and 208b), and the encrypted data packets may then leave the network switch device 200 on corresponding output security domain ports (such as 210a, 210b, 212a, and 212b) after being decrypted with a corresponding public/private key-pair at the output security domain ports (such as 210a, 210b, 212a, and 212b).

In some embodiments, a network switch device 200 architecture may include features of seL4, a high-performance operating system microkernel, to create a modular, extensible software device, which may provide control plane's Open Flow communication features and data plane's packet forwarding software features for multiple different VLAN and SDN switch device products. The architecture of the network switch device 200 is configured such that a control plane and data plane software is broken into multiple software modules based on functionality, and functionality may be duplicated as necessary to ensure each security domain has identical but separate functionality. The architecture of the network switch device 200 may include an outer layer router 202 and an inner layer router 204. Each of the outer layer router 202 and the inner layer router 204 may include one or more input/output ports. Each of the one or more input/output ports has its own seL4 software module that has a software verification and modification function.

An outer layer router 202 may include input ports (such as 206a, 206b, 208a, and 208b) and output ports (such as 210a, 210b, 212a, and 212b) where each of the input ports 206 and the output ports 208 are assigned to a single security domain at a time. Each output port (such as 210a, 210b, 212a, and 212b) in the outer layer router 202 is associated with each input port (such as 206a, 206b, 208a, and 208b) in the outer layer router 202. For instance, the input ports (namely, 206a, 206b) and the corresponding output ports (namely, 210a, 210b) are assigned to a secure security domain associated with secure data packets (SKP), and the input ports (namely, 208a, 208b) and the corresponding output ports (namely, 212a, 212b) are assigned to an unsecure security domain associated with unsecure data packets (UKP). When the input ports 206 and the output ports 208 are configured, a controller may assign key-pairs to each security domain. For instance, the input ports (namely, 206a, 206b) and the corresponding output ports (namely, 210a, 210b) assigned to a secure security domain may have a same key-pair. Thus, when a data packet comes in the input ports (such as 206a, 206b, 208a, and 208b), the data packet is encrypted with the input ports (such as 206a, 206b, 208a, and 208b) associated key-pair and the encrypted data packet is then sent to the inner layer router 204. The data packets received from the inner layer router 204 are then decrypted at corresponding output ports (such as 210a, 210b, 212a, and 212b) using the same key-pair, and thereby assuring only the data packets from a same security domain can be routed properly.

During operation, a data packet may be received by an input port (such as 206a, 206b, 208a, or 208b) of the outer layer router 202 where the data packet may be encrypted, and then the encrypted data packet may be forwarded from the input port (such as 206a, 206b, 208a, or 208b) to a corresponding output port (such as 210a, 210b, 212a, or 212b) of the outer layer router 202 of same security domain where the data packet is handled by software modules in the same security domain, so it is impossible for the encrypted data packet to be decrypted at output ports (such as 210a, 210b, 212a, or 212b) assigned to different networks associated with corresponding security domains. For instance, secure data packet may be encrypted at the input port (such as 206a, 206b) assigned to a secure security domain using a secure key-pair, and then the encrypted data packet may only be decrypted at a corresponding output port (such as 210a, 210b) assigned to a secure security domain using same secure key-pair.

In some embodiments, the network switch device 200 may use seL4 capabilities-based access control and domains to execute necessary constraints while separating data packets associated with different security domains. The seL4 software verification tools may validate correctness of an identification of various types of the data packets by a data plane, and then the separation of the data packet flows in a static network switch device 200 design. The seL4 capabilities and domains ensure that the data packet separation in a dynamic network switch device 200 design, in which the network switch device 200 ports can be moved from one security domain to another security domain at a direction of an Open Flow controller, ostensibly while at a same time network-connected resources (such as sensor devices, processing resources, or data storage resources) connected to the network switch device 200 are being sanitized and reassigned to the appropriate security domain.

Network switching device 200 described herein provide several advantages compared to other conventional Virtual Local Area Network (VLAN) and Software Defined Networks (SDN) switch solutions. For instance, the network switch device 200 may benefit any customer with multiple security domains, military or otherwise, by providing more efficient and effective data security than current VLAN and SDN switch solutions products. For military customers, the network switch device 200 provide opportunities for the VLAN and SDN based network designs that may increase network utility and lower the number of equipment and network reconfiguration costs. The network switch device 200 may also benefit switch device manufacturers by providing modular software that can be reconfigured to address differing customer needs while facilitating rapid security certification of the resulting switch device products by leveraging a secure architecture and operating system.

A software implementation of the network switch device 200 may provide a multiplatform compatible base for developing the network switch device 200 products tailored to specific military and non-military customer needs. Since the seL4 and the network switch device 200 components are analyzed and formally verified for safety and security, the network switch device 200 software features are customizable and may be improved or replaced as customer tasks change or standards advance to create new customized network switch device 200 products that can be quickly brought to market. More specifically, the network switch device 200 may be used in security services (such as military services) manned and unmanned vehicles for connecting their vehicle communication systems, in secure networks at forward command locations of a security service company, at a Global Information Grid (GIG), and sensitive installations like secure buildings. The network switch device 200 may also be used to secure virtual networks spanning multiple locations, internet service providers, and cloud service providers.

Figure 3:
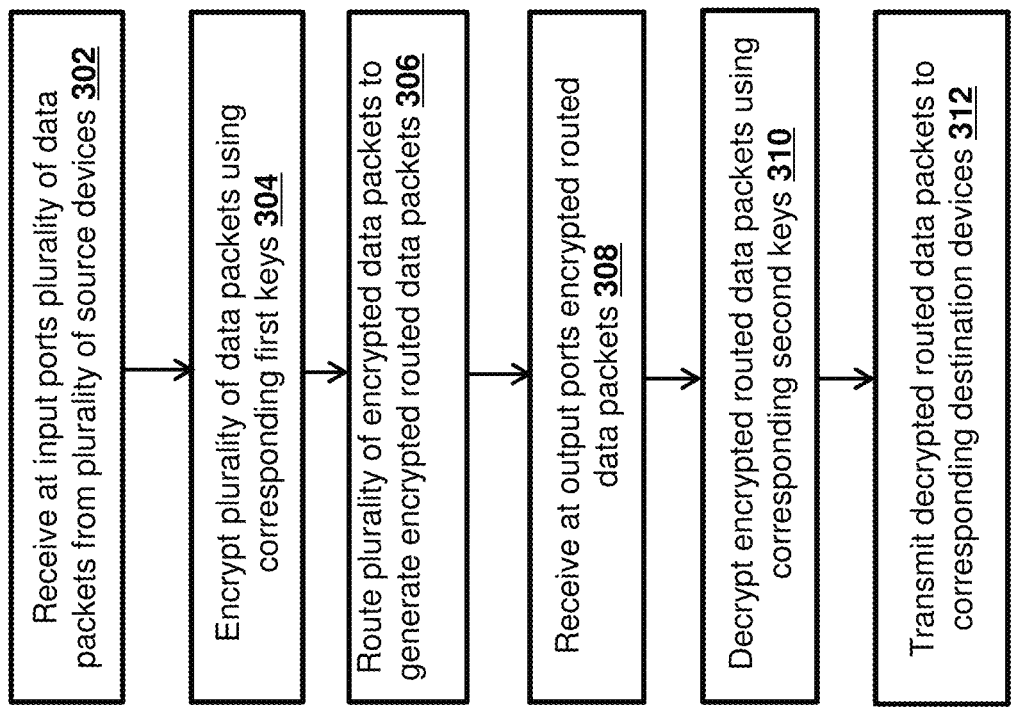
FIG. 3 illustrates execution of a method for data isolation of a plurality of data packets produced from a plurality of source devices, according to an exemplary embodiment.

FIG. 3 shows execution steps of data isolation of a plurality of data packets from a plurality of source devices, according to an exemplary method 300. The exemplary method 300 shown in FIG. 3 comprises execution steps 302, 304, 306, 308, 310, and 312. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 300 of FIG. 3 is described as being executed by a single computer, referred to as a switching computer in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the switching computer described herein.

In a first step 302, one or more input ports of an outer layer router in a switching computer may receive a plurality of data packets from a plurality of source devices. The non-limiting examples of the plurality of source devices may include, but not limited to, a sensor device, a satellite device, a communication device, and a base station. Each of the plurality of source devices such as the sensor device, the satellite device, the communication device, and the base station are configured to generate, update, and transmit data packets of different types. The data packets may be associated with different security domains and/or different data types. The security domains may be a secret domain, a sensitive domain, a classified domain, and a sensitive but unclassified domain. For example, each source device may generate data associated with a different security domain such as secret data, classified data, and unclassified data.

In some embodiments, a switching computer may select one or more source devices from the plurality of source devices to update and transmit the data packets. In some embodiments, the switching computer may select the one or more source devices from the plurality of source devices to generate the data packets based on one or more pre-defined selection rules. For instance, the switching computer may select the one or more source devices from the plurality of source devices to generate the data packets based on information associated with one or more mission tasks. For example, when the mission task is associated to movement of a vehicle through a forest area, then devices associated with providing data such as road data, weather data, navigation data corresponding to the forest area may be selected by the switching computer for generating the data packets.

Each of the plurality data packets generated by the plurality of source devices may include machine-readable codes. The machine-readable codes may contain data fields describing a detected event associated with a data source device from which the data packet has been generated. In some embodiments, the machine-readable codes may contain data fields describing a detected security domain associated with the source device from which the data packet has been generated.

In the illustrated embodiment, the outer layer router may include a first input port and a second input port. The first input port of the outer layer router may receive a first data packet from a first source device and the second input port of the outer layer router may receive a second data packet from a second source device. The first input port is associated with a first data security attribute, and the first data security attribute is associated with a first set of cryptographic key pair. Correspondingly, the second input port is associated with a second data security attribute, and the second data security attribute is associated with a second set of cryptographic key pair. The first and the second data security attributes may be selected from a group consisting of secret data, sensitive data, classified data, unclassified data, and sensitive but unclassified data.

In some embodiments, a processor of the switching computer may parse each of the first data packet and the second data packet. The processor may parse the first data packet and the second data packet to determine machine-readable codes in the first data packet and the second data packet by executing one or more parsing techniques. The machine-readable codes determined based on the parsing of the first data packet and the second data packet may correspond to one or more data security attributes associated with the first data packet and the second data packet. In some embodiments, the processor of the switching computer upon determination of the machine-readable codes in the first data packet and the second data packet then matches the determined machine-readable codes with a set of one or more security attribute models. Based on the matching results, the processor may then determine information associated with the first and the second data security attributes associated with the first data packet and the second data packet.

In some embodiments, the processor may determine machine-readable code within the first data packet, and upon determining that the first data packet includes a machine-readable code containing a term associated with secret data based on the execution of the security attribute model on the first data packet, then a secret data security attribute is assigned to the first data packet. Similarly, the processor may determine machine-readable code within the second data packet, and upon determining that the second data packet includes a machine-readable code containing a term associated with sensitive data based on the execution of the security attribute model on the second data packet, then a sensitive data security attribute is assigned to the second data packet.

In some embodiments, a processor may parse the information of the first data packet and the second data packet into a set of individual words according to word separators. The word separators may be punctuation characters or the space character. Alternatively, the characters which form words and the characters which indicate word separators can be stored in separately maintained lists. Each word set represents a portion of the information of a particular data packet. A processor may then assign a unique sequential location to the words as the words are parsed. The location of a first word of a next data packet sequentially follows the location of a last word of a previous data packet. The words and their assigned locations form pairs. The processor may then identify data security attributes common to the set of words. The processor may then generate a data packet metaword for each common data security attribute. The location of the last word of the set of words having the common data security attribute is assigned to the data packet metaword to form data packet metaword pairs. The data packet metawords may include the data packet source device address, a brief description of the information of the data packet, a size, or a date of a particular data packet. The data packet metawords may also indicate the type of information stored in the data packets such as textual, graphic, audio, video or software program. One data packet metaword indicates the end of each data packet, and another metaword can indicate if a data packet has been deleted.

In a next step 304, a processor of the switching computer may encrypt a payload of the plurality of data packets obtained from the plurality of source devices using a first key of a corresponding first set of cryptographic key pair to generate a plurality of encrypted data packets. The payload of the plurality of data packets is the part of transmitted plurality of data packets that is the intended message. In one example, each of the plurality of data packets may include the payload, which is encapsulated in a frame composed of framing bits and a frame check sequence. In another example, each of the plurality of data packets may include the payload and remaining portion of the plurality of data packets is protocol overhead.

In some embodiments, the processor may securely transform the plurality of data packets using cryptographic techniques. The cryptographic techniques constitute in implementing security services for the plurality of data packets by providing encipherment/decipherment of the plurality of data packets. The cryptographic techniques may include a pair of data transformations, encryption and decryption, respectively. For instance, the processor may initially encrypt the plurality of data packets associated using a first key of a corresponding set of cryptographic key pair.

In the illustrated embodiment, the processor may encrypt a payload of the first data packet using a first key in the first set of cryptographic key pair to generate a first encrypted data packet. The processor may further encrypt a payload of the second data packet using a first key in the second set of cryptographic key pair to generate a second encrypted data packet. In order to do the encryption, the processor may execute an encryption transformation technique to each data item in the first and the second data packet, known as plaintext, and generates a new data item, known as cipher text (the first encrypted data packet and the second encrypted data packet). The encryption transformation technique may use as input both the plaintext data and an independent data value known as an encryption key.

In a next step 306, an inner layer router of the switching computer may route the first encrypted data packet and the second encrypted data packet to generate a first encrypted routed data packet and a second encrypted routed data packet.

In some embodiments, the inner layer router may route the first encrypted data packet and the second encrypted data packet to output ports of the outer layer router. In some embodiments, each input port of the outer layer router has a corresponding output port. In some embodiments, each input port and corresponding output port of the outer layer router share a same set of the cryptographic key pair and may be connected to each other. The inner layer router may route the first encrypted data packet and the second encrypted data packet (encrypted at the first and the second input ports respectively) to their corresponding output ports (for example, the first and the second output ports respectively) of the outer layer router.

In a next step 308, a first output port of the outer layer router may receive the first encrypted routed data packet and a second output port of the outer layer router may receive the second encrypted routed data packet. The first output port is associated with a first data security attribute and the second output port is associated with a second data security attribute.

In a next step 310, a processor of the switching computer may decrypt encrypted routed data packets associated using a second key of a corresponding set of cryptographic key pair. For instance, the processor may decrypt the first encrypted routed data packet using a second key of the first set of cryptographic key pair to generate a first routed data packet. The processor may also decrypt the second encrypted routed data packet using a second key of the second set of cryptographic key pair to generate a second routed data packet. The processor may execute a decryption transformation technique to cipher text for each data item in the first and the second encrypted routed data packet, which results in the regeneration of the original plaintext of each data item in the first and the second encrypted routed data packet. The decryption transformation technique uses a decryption key.

In some embodiments, a processor may execute different types of cryptographic techniques to securely transform the first and the second encrypted routed data packet when transmitting from the input ports (first and second input ports) to the output ports (first and second output ports) of the outer layer router. For instance, the processor may execute a symmetric cryptographic technique and/or a public key (or asymmetric) cryptographic technique.

In symmetric cryptographic technique, the processor may use same key in the encryption and decryption transformations of the first and the second encrypted routed data packet at the input ports (first and second input ports) and the output ports (first and second output ports) of the outer layer router. Using a secure channel, the processor may transmit a data value to be used as a key to both the input ports (first and second input ports) and corresponding output ports (first and second output ports) of the outer layer router. The key may be kept secret from all ports other than the input ports (first and second input ports) and their corresponding output ports (first and second output ports) of the outer layer router. This enables either the input ports (first and second input ports) or their corresponding output ports (first and second output ports) of the outer layer router to protect a data packet sent to the other ports by encrypting it using the shared key. The corresponding output port can decrypt the data packet, but other ports cannot.

In public key cryptographic technique, the processor may use a key pair comprising a public key and a private key in the encryption and decryption transformations of the data packets at the input ports (first and second input ports) and the output ports (first and second output ports) of the outer layer router. For instance, the processor may use one of these keys for encryption of the data packets at the input ports (first and second input ports) and the other key for decryption of the data packets at corresponding output ports (first and second output ports). In the encryption mode, the processor may use the public key for encryption of the data packets at the input ports (first and second input ports) and the corresponding output port (first and second output ports) may use the private key of the same key pair for decryption of the data packets.

In some embodiments, a first output port of the outer layer router may receive the second encrypted routed data packet and a second output port of the outer layer router may receive the first encrypted routed data packet. The first output port is associated with the first data security attribute and the second output port is associated with the second data security attribute. Then in a next step, a processor of the switching computer may decrypt encrypted routed data packets using a second key of a corresponding set of cryptographic key pair. Upon execution of decryption techniques or prior to the execution of the decryption techniques, the processor may determine whether the second encrypted routed data packet can be decrypted at the first output port using the second key of the first set of cryptographic key pair. The processor upon determining that the second encrypted routed data packet cannot be decrypted using the second key of the first set of cryptographic key pair at the first output port may then drop the second encrypted routed data packet. In some embodiments, the processor upon determining that the second encrypted routed data packet cannot be decrypted using the second key of the first set of cryptographic key pair at the first output port may then generate and transmit a notification corresponding to receipt of a wrong data packet to the inner layer router. Similarly, the processor may also determine whether the first encrypted routed data packet can be decrypted at the second output port using the second key of the second set of cryptographic key pair. The processor upon determining that the first encrypted routed data packet cannot be decrypted using the second key of the second set of cryptographic key pair at the second output port may then drop the first encrypted routed data packet. In some embodiments, the processor upon determining that the first encrypted routed data packet cannot be decrypted using the second key of the second set of cryptographic key pair at the second output port may then generate and transmit a notification corresponding to receipt of a wrong data packet to the inner layer router.

In a next step 312, the first output port may transmit the first routed data packet to a first destination device and the second output port may transmit the second routed data packet to a second destination device.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a first input port of an outer layer router in a switching computer, a first data packet from a first source device, wherein the first input port is associated with a first data security attribute, wherein the first data security attribute is associated with a first cryptographic key pair, and wherein the first data security attribute is associated with a first output port of the outer layer router for receiving a first encrypted routed data packet;
receiving, by a second input port of the outer layer router of the switching computer, a second data packet from a second source device, wherein the second input port is associated with a second data security attribute, wherein the second data security attribute is associated with a second cryptographic key pair, and wherein the second data security attribute is associated with a second output port of the outer layer router for receiving a second encrypted routed data packet;

encrypting, by a processor of the switching computer, a payload of the first data packet using a first key in the first cryptographic key pair to generate a first encrypted data packet;

encrypting, by the processor, a payload of the second data packet using a first key in the second cryptographic key pair to generate a second encrypted data packet;

routing, by an inner layer router of the switching computer, the first encrypted data packet and the second encrypted data packet to generate the first encrypted routed data packet and the second encrypted routed data packet;

receiving, by the first output port of the outer layer router of the switching computer, the first encrypted routed data packet;

decrypting, by the processor, the first encrypted routed data packet using a second key of the first cryptographic key pair to generate a first routed data packet;

transmitting, by the first output port, the first routed data packet to a first destination device;

receiving, by the second output port of the outer layer router of the switching computer, the second encrypted routed data packet;

decrypting, by the processor, the second encrypted routed data packet using a second key of the second cryptographic key pair to generate a second routed data packet; and transmitting, by the second output port, the second routed data packet to a second destination device.

2. The computer-implemented method according to claim 1, further comprising:
receiving, by the first output port, the second encrypted routed data packet;
determining, by the processor, whether the second encrypted routed data packet can be decrypted using the second key of the first cryptographic key pair at the first output port; and
dropping, by the processor, the second encrypted routed data packet in response to determining by the processor that the second encrypted routed packet data cannot be decrypted using the second key of the first cryptographic key pair.

3. The computer-implemented method according to claim 1, further comprising:
receiving, by the second output port, the first encrypted routed data packet;
determining, by the processor, whether the first encrypted routed data packet can be decrypted using the second key of the second cryptographic key pair at the second output port; and
dropping, by the second output port, the first encrypted routed data packet in response to determining by the processor that the first encrypted routed packet data cannot be decrypted using the second key of the second cryptographic key pair.

4. The computer-implemented method according to claim 1, wherein the first source device is selected from a group consisting of a sensor device, a satellite device, a communication device, and a base station.

5. The computer-implemented method according to claim 1, wherein the second source device is selected from a group consisting of a sensor device, a satellite device, a communication device, and a base station.

6. The computer-implemented method according to claim 1, wherein the first data packet comprises machine-readable code containing data fields describing a detected event associated with the first source device.

7. The computer-implemented method according to claim 6, further comprising parsing, by the processor of the switching computer, the first data packet to determine machine-readable codes corresponding to data security attributes for the first data packet.

8. The computer-implemented method according to claim 1, wherein the second data packet comprises machine-readable code containing data fields describing a detected event associated with the second source device.

9. The computer-implemented method according to claim 8, further comprising parsing, by the processor of the switching computer, the second data packet to determine machine-readable codes corresponding to data security attributes for the second data packet.

10. The computer-implemented method according to claim 1, wherein the first data security attribute and the second data security attribute is selected from a group consisting of secret data, sensitive data, classified data, unclassified data, and sensitive but unclassified data.

11. A system comprising:
a first source device having a first processor configured to generate a first data packet;
a second source device having a second processor configured to generate a second data packet; and
a switching computer comprising:
an outer layer router of the switching computer comprising a first input port and a second input port,
wherein the first input port receives a first data packet from the first source device and wherein the first input port is associated with a first data security attribute, wherein the first data security attribute is associated with a first cryptographic key pair, and wherein the first data security attribute is associated with a first output port of the outer layer router for receiving a first encrypted routed data packet, and
wherein the second input port receives a second data packet from the second source device and wherein the second input port is associated with a second data security attribute, wherein the second data security attribute is associated with a second cryptographic key pair, and wherein the second data security attribute is associated with a second output port of the outer layer router for receiving a second encrypted routed data packet; and
a processor configured to:
encrypt a payload of the first data packet using a first key in the first cryptographic key pair to generate a first encrypted data packet; and
encrypt a payload of the second data packet using a first key in the second cryptographic key pair to generate a second encrypted data packet; and
an inner layer router of the switching computer configured to:
route the first encrypted data packet and the second encrypted data packet to generate the first encrypted routed data packet and the second encrypted routed data packet;
the outer layer router of the switching computer further comprising the first output port and the second output port,
wherein the first output port receives the first encrypted routed data packet, and
wherein the second output port receives the second encrypted routed data packet, the processor is further configured to:
  decrypt the first encrypted routed data packet using a second key of the first cryptographic key pair to generate a first routed data packet, wherein the first output port transmits the first routed data packet to a first destination device; and
  decrypt the second encrypted routed data packet using a second key of the second cryptographic key pair to generate a second routed data packet, wherein the second output port transmits the second routed data packet to a second destination device.

12. The system according to claim 11, wherein the first output port is further configured to:
  receive the second encrypted routed data packet, wherein the processor determines whether the second encrypted routed data packet can be decrypted using the second key of the first cryptographic key pair at the first output port; and
  drop the second encrypted routed data packet in response to determining by the processor that the second encrypted routed packet data cannot be decrypted using the second key of the first cryptographic key pair.

13. The system according to claim 11, wherein the second output port is further configured to:
  receive the first encrypted routed data packet, wherein the processor is configured to determine whether the first encrypted routed data packet can be decrypted using the second key of the second cryptographic key pair at the second output port; and
  drop the first encrypted routed data packet in response to determining by the processor that the first encrypted routed packet data cannot be decrypted using the second key of the second cryptographic key pair.

14. The system according to claim 11, wherein the first source device is selected from a group consisting of a sensor device, a satellite device, a communication device, and a base station.

15. The system according to claim 11, wherein the second source device is selected from a group consisting of a sensor device, a satellite device, a communication device, and a base station.

16. The system according to claim 11, wherein the first data packet comprises machine-readable code containing data fields describing a detected event associated with the first source device.

17. The system according to claim 16, wherein the processor is further configured to parse the first data packet to determine machine-readable codes corresponding to data security attributes for the first data packet.

18. The system according to claim 11, wherein the second data packet comprises machine-readable code containing data fields describing a detected event associated with the second source device.

19. The system according to claim 18, wherein the processor is further configured to parse the second data packet to determine machine-readable codes corresponding to data security attributes for the second data packet.

20. The system according to claim 11, wherein the first data security attribute and the second data security attribute is selected from a group consisting of secret data, sensitive data, classified data, unclassified data, and sensitive but unclassified data.

* * * * *